United States Patent [19]

Ichihara et al.

[11] 4,177,671

[45] Dec. 11, 1979

[54] APPARATUS FOR SENSING AIR-PRESSURE DROP IN A TIRE

[75] Inventors: Isao Ichihara; Yasuo Oguni; Harunori Shiratori, all of Toyota, Japan

[73] Assignee: Toyota Jidosha Kogyo Kabushiki Kaisha, Aichi, Japan

[21] Appl. No.: 930,649

[22] Filed: Aug. 3, 1978

Related U.S. Application Data

[63] Continuation-in-part of Ser. No. 780,822, Mar. 24, 1977, abandoned.

[30] Foreign Application Priority Data

Mar. 25, 1976 [JP] Japan ................................. 51-34005

[51] Int. Cl.² .............................................. B60C 23/04
[52] U.S. Cl. ...................................... 73/146.5; 340/58
[58] Field of Search ................. 73/146.5, 146.8, 146.4; 340/58

[56] References Cited

U.S. PATENT DOCUMENTS 3,982,225 9/1976 Schlanzky ............................. 340/58

Primary Examiner—Donald O. Woodiel
Attorney, Agent, or Firm—Stevens, Davis, Miller & Mosher

[57] ABSTRACT

An apparatus for sensing air-pressure drop in an automobile tire which comprises an air chamber having an internal air pressure maintained substantially equal to that of a tire under normal conditions and a sensor displaceable in accordance with differences in pressure between the air chamber and the tire. The apparatus is mounted in the inner end of the air valve of the tire, and when the air pressure in the tire drops to a certain level below an initial air pressure setting, the sensor is displaced. Sensor displacement is detected and an appropriate signal is provided to the driver.

6 Claims, 7 Drawing Figures

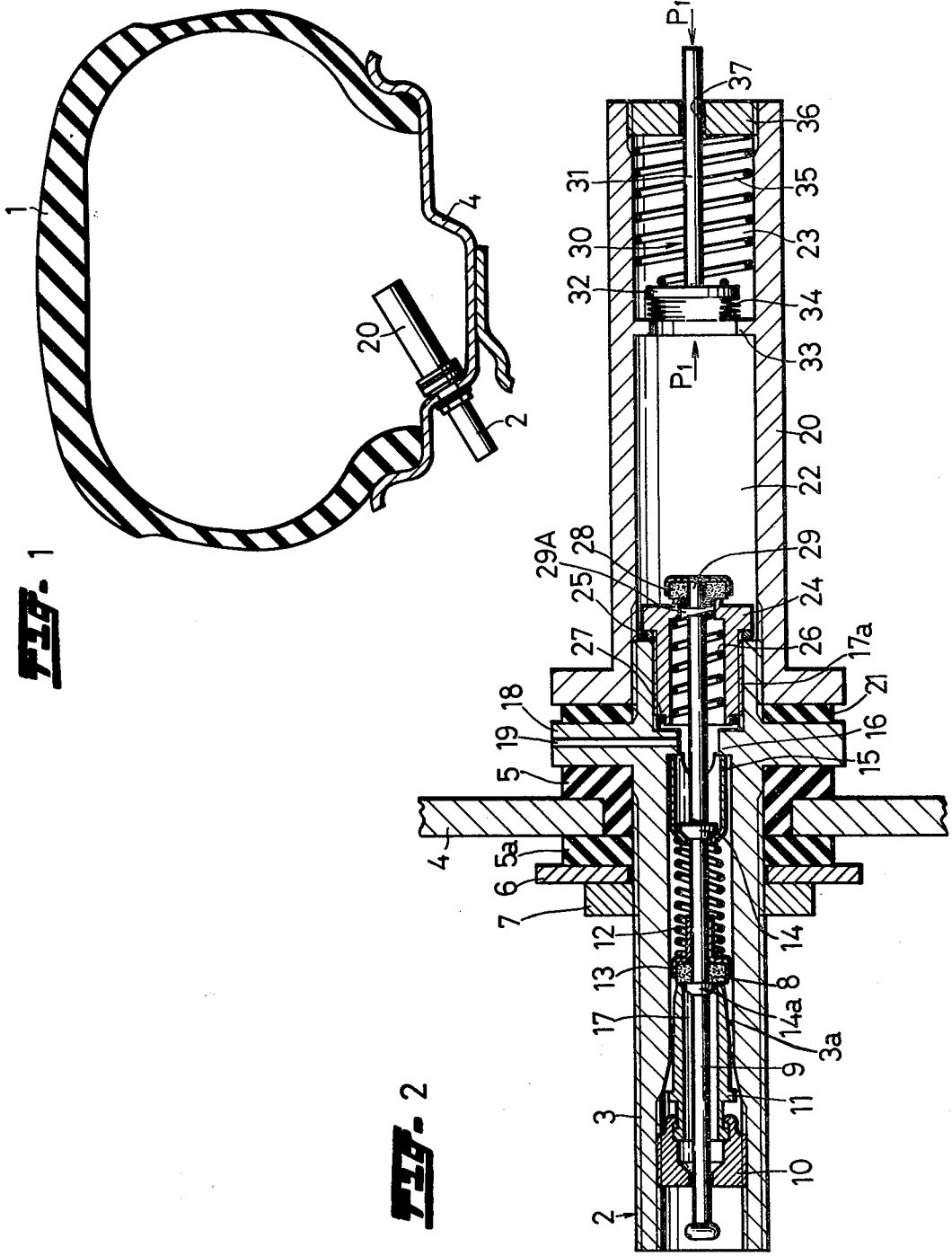

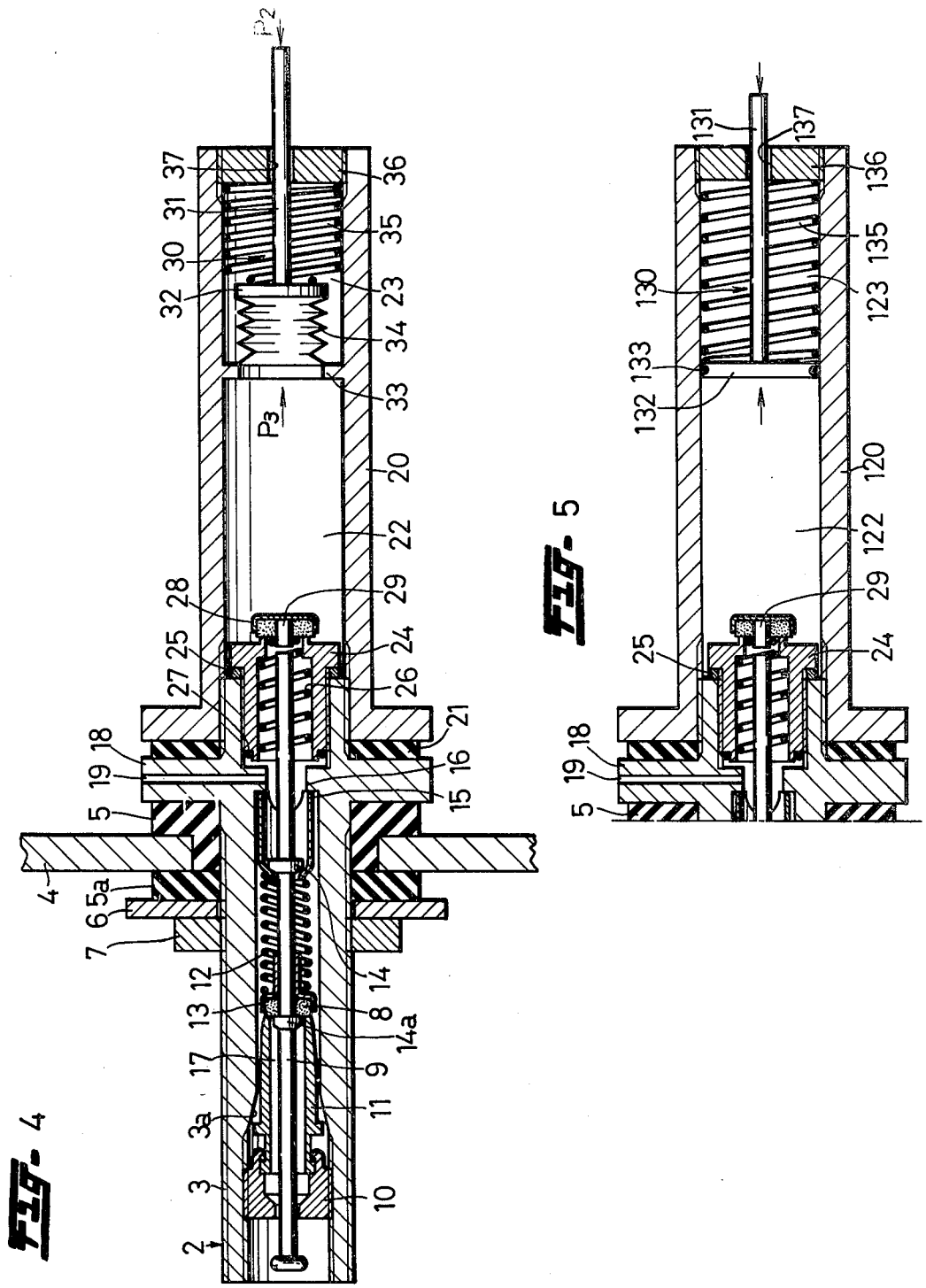

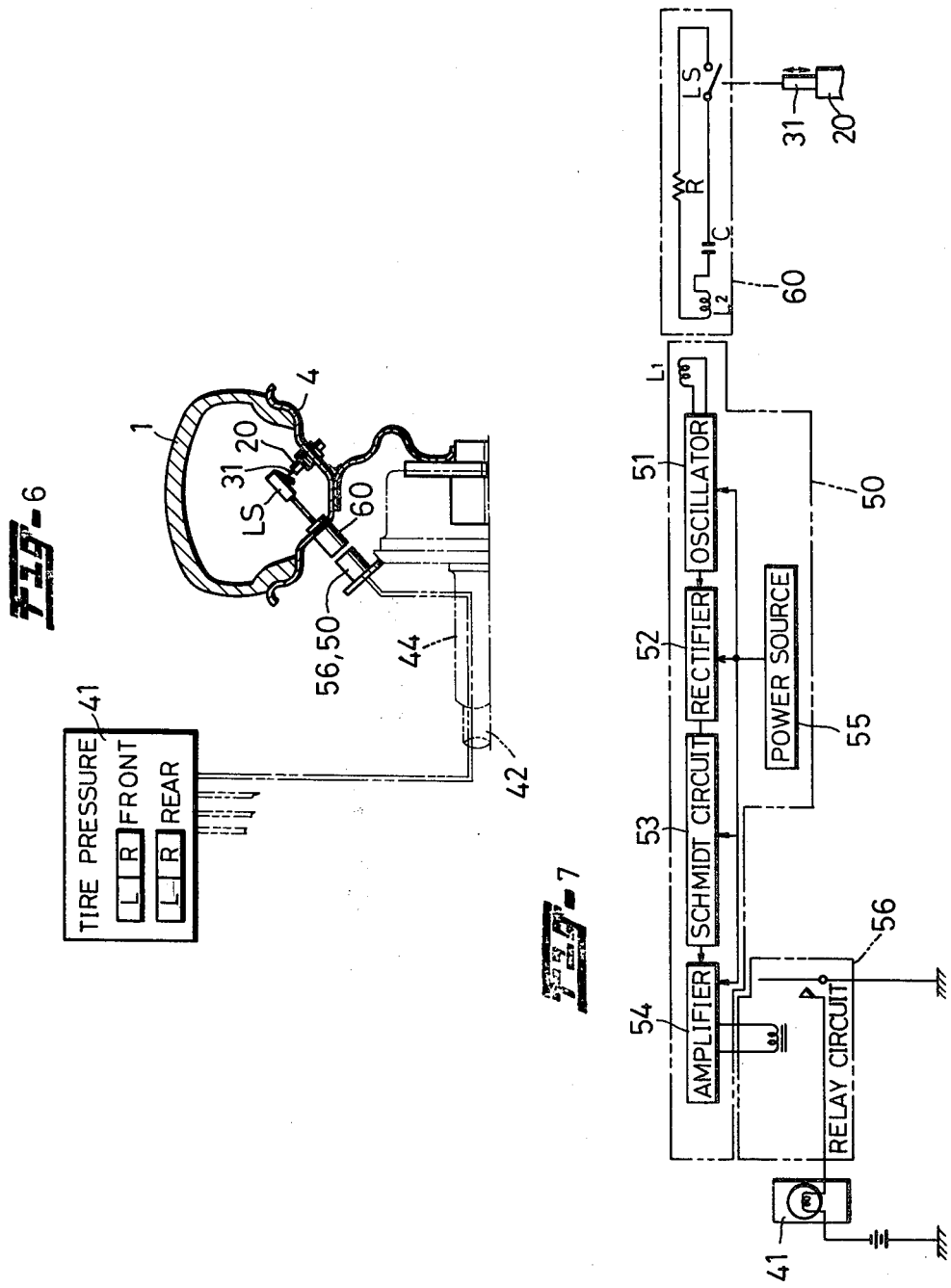

4,177,671

APPARATUS FOR SENSING AIR-PRESSURE DROP IN A TIRE

This application is a continuation-in-part of Ser. No. 780,822 filed Mar. 24, 1977, now abandoned.

BACKGROUND OF THE INVENTION

In an automobile, the shortage of air pressure in a tire tends to cause steering in the wrong direction and overheating or abrasion of the tire by bending, which will seriously shorten the life of the tire. To prevent these problems, there has been provided an apparatus to sense shortage of air pressure in the tire and generate a signal to the driver indicating the same.

However, such an apparatus senses the air-pressure drop and provides a signal only when the air pressure drops to a fixed level, and it is almost impossible to keep the air pressure in the tire within a desired range if an initial air pressure is set considerably high to serve a special purpose or at the driver's wish. Further, the apparatus is not very reliable. For example, when a tire runs hot while driving, air pressure in the tire generally rises, and in the case where the risen air pressure is relatively lower than the initial air pressure setting, the apparatus ofter may not sense it.

An object of the present invention is to provide an apparatus which can sense a predetermined amount of pressure drop in a tire from an initial air pressure setting and provide a signal to the driver regardless of the level of the initial air pressure.

Another object of the present invention is to provide an apparatus which can sense a predetermined amount of pressure drop in a tire from an initial air pressure setting without being affected by overheating of the tire.

Still another object of the present invention is to provide an apparatus for sensing an air pressure drop in a tire which can be applied in place of a known air valve on the tire, and operate reliably.

According to the present invention, there is provided an apparatus capable of keeping air pressure in a tire at a desired level to serve a special purpose or to satisfy the driver's preference.

The invention will now be described in further detail by way of example with reference to the accompanying drawings, in which:

FIG. 1 is a cross-sectional view of a tire in which the apparatus embodying the present invention is mounted;

FIG. 2 is an enlarged longitudinal sectional view of the apparatus shown in FIG. 1;

FIGS. 3 and 4 are views similar to FIG. 2 showing the apparatus in different operational positions;

FIG. 5 is a fragmentary, longitudinal view showing another embodiment of the present invention;

FIG. 6 illustrates a system for sensing and indicating the state of the apparatus shown in FIGS. 1 thru 5; and FIG. 7 illustrates a portion of the FIG. 6 system in greater detail.

Figure 3:
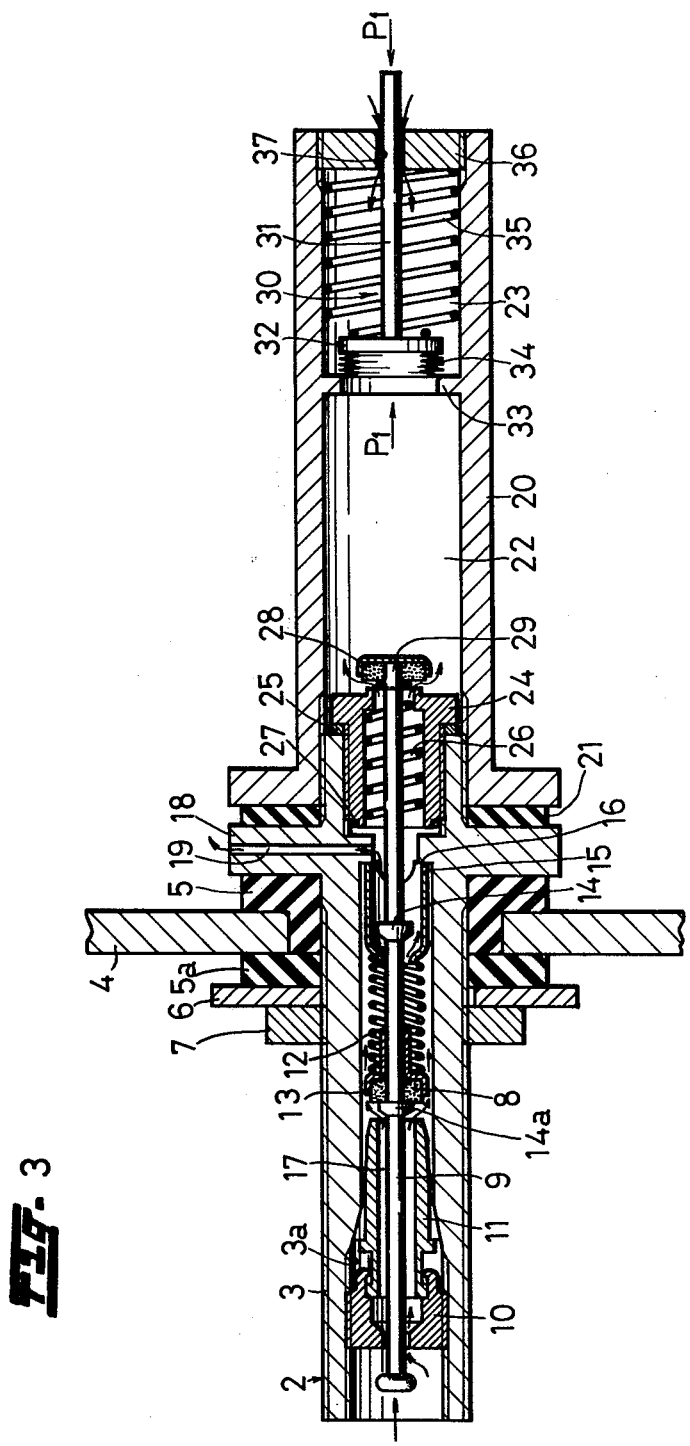

Referring now to the drawings, particularly FIGS. 1 through 4 thereof, there is shown an embodiment of the present invention in the form of an air valve 2 applied to a tubeless tire 1. The air valve 2 consists of a generally cylindrical valve body 3 having a flange 18 which is connected to a wheel rim 4 by packing members 5 and 5a, a plate washer 6 and a nut 7. The valve body 3 is provided with a cylindrical bore 3a having in the center thereof a valve rod 9 having a valve member 8 inserted along the longitudinal axis of the cylindrical bore 3a. The cylindrical bore 3a also has a valve core 10 and a cylindrical valve seat 11 connected to the valve core 10 encircling the rod 9. Further, in the middle portion of the cylindrical bore 3a, there is provided a coil spring 12 supported by a spring bearing 13 serving as a valve seat for the valve member 8 and another spring bearing 15 which is supported by a stop member 14 on the rod 9 and an annular projection 16 radially inwardly extending from the valve body 3, and the coil spring 12 urges the valve member 8 against the valve seat 11. The spring bearing 15 is secured at its right end to the annular projection 16 and engaged at its left end with the stop member 14 to prevent displacement of the rod 9 to the left as viewed in FIG. 2. The valve member 8 engages with the valve seat 11 to close an air passage 17 in the valve seat 11 under normal conditions, but when the rod 9 is pushed in against the coil spring 12 to get air into the tire 1, the valve member 8 is pressed by a valve bearing 14a secured to the rod 9 and disengages from the valve seat 11, and compressed air from an air supply (not shown) flows into the tire 1 through the air passage 17 and a valve port 19 in the flange 18 as shown by arrows in FIG. 3.

A cylindrical housing 20 is threadedly connected at its outer end through a packing 21 to the inner end of the valve body 3 which is inserted into the tire 1, and the housing 20 has a cylindrical bore separated into a first chamber 22 which is near the air valve 2 and is connected to the air passage 17 to get air into the tire 1 and a second chamber 23 which is far from the air valves 2 and communicates with the inside of the tire 1. The second chamber 23 is divided from the first chamber 22 in an airtight manner as will hereinafter be described in further detail.

At a portion 17a where the first chamber 22 is connected to the air passage 17, a cylindrical valve body 24 is threadedly connected into the inner end of the valve body 3 with a packing member 25 placed therebetween. In the cylinder bore of the valve body 24, there is provided a tension spring 26 which is supported at one end by a spring bearing 27 provided in the valve body 24, and the other end of the tension spring 26 is engaged with a valve rod 29 secured to a valve member 28, so that the tension spring 26 draws the valve rod 29 toward the left in FIG. 2 and urges the valve member 28 against the valve body 24. The valve member 28 engages with the valve body 24 to prevent communication between the air passage 17 and the first chamber 22 under normal conditions, but when the rod 9 is pushed in to get air into the tire 1, the valve rod 29 is pushed by the forward end of the rod 9 to disengage the valve member 28 from the valve body 24, and the first chamber 22 communicates with the air passage 17. Between the valve rods 9 and 29, there is provided an appropriate clearance space 29A which is so sized that air flows only into the tire for a certain brief length of time before it is admitted into both the tire 1 and the first chamber 22.

In the second chamber 23, there is provided a sensor 30 which senses difference in air pressure between the first and second chambers 22 and 23, i.e., air-pressure drop the initial air pressure setting in the tire 1. The sensor 30 comprises a rod 31 secured to a disc 32. The disc 32 is connected through an expandable bellows 34 to a radially inwardly projecting annular flange 33 defining a partition between the first and second chambers 22 and 23. The disc 32 is, thus, displaceable in accordance with variation in pressure between the first and second chambers 22 and 23. The sensor 30 has an equal surface area subjected to air pressure on both the first and second chamber sides thereof.

In the second chamber 23, there is provided a spring 35 which is supported at one end by a spring bearing 36 threadedly connected into the inner end of the housing 20, and the other end of the spring 35 is engaged with the disc 32 to urge the sensor 30 toward the first chamber 22 to return the sensor 30 to a predetermined position when the air pressure in the first chamber 22 is equal to that in the tire 1. The spring bearing 36 is provided centrally therethrough with a bore 37 through which the rod 31 extends slidably and the second chamber 23 is connected with the interior of the tire 1.

Attention is drawn to FIGS. 6 and 7 in which a system for generating a visual signal representing the state of the air-pressure drop apparatus is shown. Numeral 50 shows a known high-frequency oscillating contactless switch mounted to a break drum 43. The contactless switch 50 comprises an induction coil L1 (FIG. 7), an oscillator 51 adapted to oscillate at a certain frequency when there is no metal in the electromagnetic field of the induction coil L1, a rectifier 52, a Schmidt trigger circuit 53, an amplifier 54 and a power source 55 supplying power to the oscillator, rectifier, Schmidt trigger and amplifier. When a metal approaches the induction coil L1, the contactless switch 50 turns on a relay circuit 56 to light up a signal lamp 41 connected thereto, and when there is no metal near the induction coil L1, it turns the relay circuit 56 off to extinguish the lamp 41.

A switching circuit 60 comprises a limit switch LS having an open contact operated by the rod 31 of the sensor 30, a condenser C, a load coil L2 arranged to be parallel to the induction coil L1 and a closed circuit of a reistance R. The switching circuit 60 is mounted to the wheel rim 4 so that the load coil L2 and the induction coil L1 approach and interact with each other with every rotation of the tire 1 (see FIG. 6). Numerals 42 and 44 indicate an axle shaft and an axle housing respectively.

In the contactless coupling of the switching circuit 60 and the contactless switch 50, resistance of the oscillator 51 is slightly increased by the load coil L2 when the limit switch LS is kept open and the load coil L2 approaches the induction coil L1, i.e., the load coil L2 is in the electromagnetic field of the induction coil L1 as shown in FIGS. 6 and 7. However, since the Schmidt trigger circuit 53 is set so that it is not cut off when the oscillation is decreased by the slight increase in the resistance of the oscillator 51, the relay circuit 56 is kept off to keep the lamp 41 off.

When the limit switch LS is closed, however, the switching circuit 60 is coupled with the induction coil L1 by electromagnetic induction. Since when limit switch LS is closed the effective resistance of the coupled circuit is set to a maximum by the load coil L2, the resistance R, and the condenser C, the switching circuit 60 causes, as it approaches contactless switch 50, a reduction in the amplitude and an increase in the frequency of oscillator 51 until a point is reached where oscillation is finally stopped. This is sensed by the Schmidt trigger circuit which causes, via amplifier 54, the energization of relay circuit 56 to turn on the lamp 41.

When the rod 9 of the air valve 2 is pushed into the housing 20 to inflate the tire 1 as shown in FIG. 3, the valve member 8 disengages from the valve seat 11 to open the air passage 17, wherethrough pressurized air flows into the tire 1 and eventually into the second chamber 23 through the bore 37 is indicated by arrows in FIG. 3, Soon after the air passage 17 is opened, the rod 9 urges the valve member 28 to disengage from the valve seat 24 in the first chamber 22, so that air flows from the air passage 17 into the first chamber 22 through the cylindrical valve body 24. After a desired initial air pressure is obtained in the tire 1, the rod 9 is allowed to move back under the action of the spring 12 and the valve member 8 engages with the valve seat 11 to close the air passage 17, while the valve member 28 engages with the valve seat 24 under the action of the spring 26 to discontinue the communication between the air passage 17 and the first chamber 22.

The pressure P1 of the air introduced in the first chamber 22 is substantially equal to the initial air pressure P1 in the tire 1, so that the sensor 30 is maintained at a predetermined position as shown in FIG. 2.

Attention is now directed to FIG. 4 wherein the apparatus according to this invention is shown in its position assumed when the air pressure in the tire 1 has dropped to a certain level. When the initial air pressure P1 in the tire 1 has dropped to a level P2, the sensor 30 axially displaces itself by a distance defined by the difference between air pressures P1 and P2 by compressing the spring 35, and the displacement of the sensor 30 from the predetermined position indicates the pressure drop from the initial air-pressure setting in the tire 1. Namely, when the sensor 30 thus displaces itself, the rod 31 closes the limit switch LS of the switching circuit 60, and the load coil L2 of the switching circuit 60 approaches the induction coil L1 of the contactless switch 50 once in every rotation of the tire 1 to turn the lamp 41 on and off so as to show pressure drops in the tire 1. Thus, the lamp 41 functions to give the driver a warning by providing a signal when the air pressure in the tire 1 has dropped to a certain level below the initial air pressure setting.

The initial air pressure P1 in the tire 1 drops to a level P3 in accordance with increase in volume of the first chamber 22, while the reaction force of the spring 35 increases, when the sensor 30 is displaced. Therefore, it is necessary to take into due consideration such increase in volume of the first chamber 22, the spring rate of the spring 35 and the weight of the sensor, so that a certain pressure drop in the tire 1 always causes a predetermined distance of sensor displacement.

When the vehicle is driven, the tire 1 generally runs hot and accordingly the air pressures in the tire 1 and in the first chamber 22 rise together, and thus the sensor 30 may sense pressure drops in the tire 1 without being affected by the heat of the tire 1. Therefore, the housing 30 defining the first chamber 22 may preferably be made of a material having a good thermal conductivity.

When a certain volume of air is introduced into the tire 1 after the air pressure in the tire 1 has dropped to a certain level below the initial air pressure setting, the sensor 30 is pulled back to the predetermined position by the spring 35 because of the pressure equalization between the tire 1 and the chamber 22.

In FIG. 5, there is shown another embodiment of the present invention, wherein a piston 132 and an O-ring 133 are used in place of the disc 32, flange 33 and bellows 34. A housing 120 corresponding to the housing 20 in FIG. 2 contains a sensor 130 which comprises a piston rod 131, the piston 132 which is slidable along the inner surface of the housing 120 and the O-ring 133 interposed between the inner surface of the housing 120 and the peripheral edge of the piston 132. Further, there are provided a first chamber 122, a second chamber 123, a spring 135 and a spring bearing 136 respectively corresponding to the chamber 22, the chamber 23, the spring 35 and the spring bearing 36 in FIG. 2. A bore 137 is provided centrally through the spring bearing 136 to guide the piston rod 131 and connect the second chamber 123 to the interior of a tire.

The sensor 130 functions in the same way as the sensor 30 as hereinabove described.

While the invention has been described with reference to preferred embodiments thereof, it is to be understood that modifications or variations may be easily made without departing from the scope of this invention which is defined by the appended claims.

What is claimed is:

1. An apparatus for sensing air-pressure drop in an automobile tire, adapted for connection with an ordinary air valve having a cylindrical valve body mounted to a tire rim and projecting into the tire at one end to define a valve port, a valve member provided in said valve body designed to open and close a first air passage in said valve body, a second air passageway connected to said first passageway having an exit port on the interior of said tire, said valve port being connected with said first air passageway, a first valve rod axially movable for moving said valve member in one direction to open said first air passageway so that air flows from said first passageway into said second passageway and from there into said tire and a spring urging said valve member in another direction to close said first air passageway, said apparatus comprising:

a cylindrical housing mountable to said one end of said valve body;

a differential pressure sensor dividing the interior of said housing into a first chamber having an air inlet located between said first and second air passageways such that a portion of the air exiting from said first passageway passes through said inlet without passing through said second passageway and a second chamber connected with the interior of the tire, said sensor being normally maintained at a predetermined position by virtue of an equilibrium in air pressure between said first chamber and said interior of the tire and displaceable upon breakage of said equilibrium resulting from pressure drop in said tire to provide an indication of said air pressure drop;

a normally closed valve provided at said air inlet adapted to open for air connecting said first chamber with said first passageway in response to the opening of said first air passageway; and means provided in said second chamber for returning said sensor to said pedetermined position when said air pressure of said tire is raised to a level substantially equal to that of said first chamber.

2. The invention as defined in claim 1 wherein said normally closed valve comprises a cylindrical valve body threadedly connected into said one end of said valve body of said air valve and having one end opening to said first and second air passageways and another end opening in said first chamber and a valve member normally closing said another end, a tension spring urging said valve member against said another end of said normally closed valve body, and a second valve rod secured to said normally closed valve member axially movable with movement of said first rod in said one direction to disengage said normally closed valve member from said normally closed valve body.

3. The invention as defined in claim 1 wherein said sensor comprises a circular piston slidably placed in said housing, an O-ring encircling said piston to seal a clearance between said piston and the inner surface of said housing, and a piston rod having one end connected to the center of said piston and another end projecting outwardly from said housing through said second chamber.

4. The invention as defined in claim 3 wherein said returning means comprises a circular end plate secured to said housing in said second chamber and a compression spring inserted between said end plate and said piston, said end plate being centrally provided therethrough with a hole through which said piston rod slidably extends and said second chamber is connected with said interior of said tire.

5. Th invention as defined in claim 1 wherein said sensor comprises an annular flange radially inwardly projecting from the inner surface of said housing between said first and second chambers, a disc provided in said second chamber, a bellows connected between said disc and said flange in an air tight manner and an indication rod connected at one end to the center of said disc and another end projecting outwardly from said housing through said second chamber.

6. The invention as defined in claim 5 wherein said returning means comprises a circular end plate secured to said housing in said second chamber and a compression spring inserted between said end plate and said disc, said end plate being centrally provided therethrough with a hole through which said indication rod slidably extends and said second chamber is connected with said interior of said tire.

* * * * *